Jan. 3, 1950 E. MERCIER ET AL 2,493,356
APPARATUS FOR REMOVING DUST FROM GASES
Filed May 29, 1945 5 Sheets-Sheet 1

Ernest Mercier and Marcel Ehlinger
INVENTORS
By George H. Corey
Their Attorney

Jan. 3, 1950     E. MERCIER ET AL     2,493,356
APPARATUS FOR REMOVING DUST FROM GASES
Filed May 29, 1945     5 Sheets-Sheet 2

Ernest Mercier and Marcel Ehlinger
INVENTORS

By George H. Corey
Their Attorney

Jan. 3, 1950   E. MERCIER ET AL   2,493,356
APPARATUS FOR REMOVING DUST FROM GASES
Filed May 29, 1945   5 Sheets-Sheet 3

Ernest Mercier and Marcel Ehlinger
INVENTORS

By

George H. Carey

Their Attorney

Jan. 3, 1950   E. MERCIER ET AL   2,493,356
APPARATUS FOR REMOVING DUST FROM GASES
Filed May 29, 1945   5 Sheets-Sheet 4

Ernest Mercier and Marcel Ehlinger
INVENTORS
By George H. Corey
Their Attorney

Jan. 3, 1950     E. MERCIER ET AL     2,493,356
APPARATUS FOR REMOVING DUST FROM GASES
Filed May 29, 1945     5 Sheets-Sheet 5
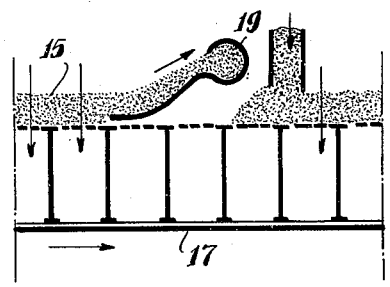
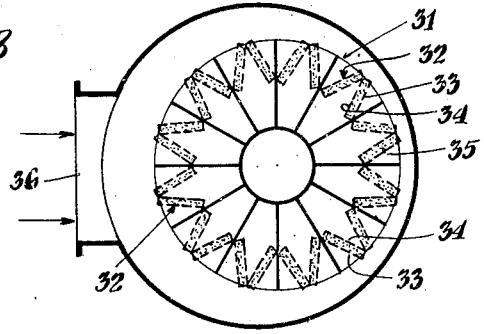
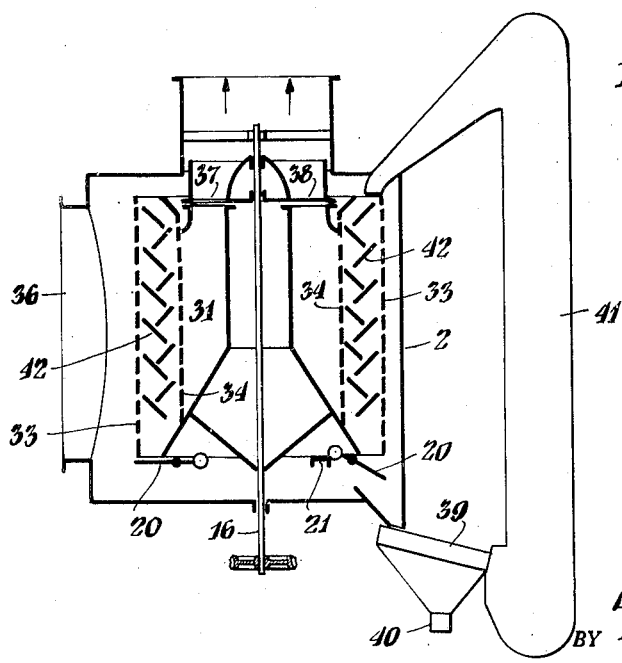
INVENTORS
Ernest Mercier
BY Marcel Ehlinger
George H. Corey
ATTORNEY Patented Jan. 3, 1950

2,493,356

UNITED STATES PATENT OFFICE 2,493,356

APPARATUS FOR REMOVING DUST FROM GASES

Ernest Mercier and Marcel Ehlinger, Paris, France, assignors, by mesne assignments, to Moore, Inc., Atlanta, Ga., a corporation of Georgia Application May 29, 1945, Serial No. 596,500
In France February 16, 1943

Section 1, Public Law 690, August 8, 1946
Patent expires February 16, 1963

17 Claims. (Cl. 183—46)

This invention relates to apparatus for removing from a gas dust or other subdivided material suspended in the gas. The invention particularly relates to continuously operating apparatus for filtering the gas to remove the suspended material therefrom and for continuously effecting decontamination of the filtering medium.

The object of the invention is to remove from gases the dust particles drawn along therewith, whatever be their origin and also whatever be the temperature and the pressure of the gases. The invention may be applied, in particular, to the separation of dust particles from the hot gases issuing from the firebox of a boiler and especially from a boiler heated by gases under pressure, but the invention is not limited to such applications.

The principle of the invention consists in making use, as filtering elements, of sand or other suitable particulate material which is suitably chosen as to size and quality and is distributed in such a manner that a small volume and a small depth of a mass thereof provides a considerable surface and through which the gases to be purified may pass without an excessive pressure loss. The invention essentially comprises means for removing the sand, as it becomes charged with the dust, in order to free it from the dust particles which have become entrapped and finally for returning the sand for re-use, the whole operation being carried out without necessitating any stoppage in the operation of the apparatus and without causing the sand to lose the temperature which it may have acquired in contact with the gases.

The whole of these operations are effected within an enclosure so designed that it may withstand the pressure of the gases as well as the temperature they may have reached.

According to one embodiment of the invention, the sand is placed between two vertical walls either in the form of a grid or made of perforated sheet metal, so as to constitute a filtering surface composed of filter units. These units may be arranged as a cylinder or in any suitable manner, so as to complete the cells or passages through which the gas passes. Preferably these units are arranged in the cells as the faces of a prism having a star section.

Fig. 1 of the accompanying drawing shows diagrammatically one embodiment of the invention.

Fig. 8 shows in horizontal section a modified arrangement of the filter units in the cells.

Fig. 9 shows in vertical section a modification of the apparatus of Fig. 6.

Fig. 10 is a vertical section on line 10—10 of Fig. 3 shown as a development about the vertical axis.

Figure 1:
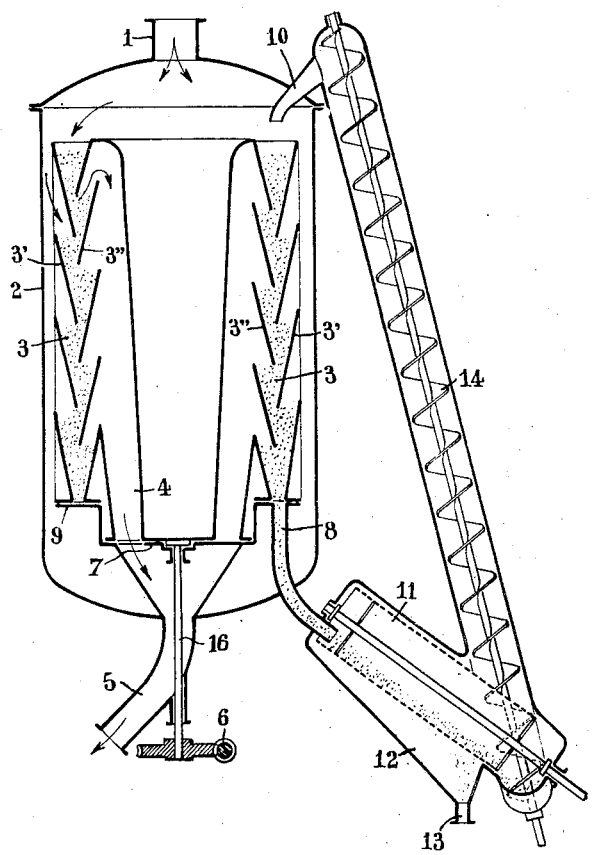

In Fig. 1, the dust laden gases enter through the pipe 1 into an enclosure 2 designed to withstand the pressure of the gas which may have a high value, for example 150 kgs./cm.$^2$. Following the arrows, the gases pass through a mass of sand 3 which is arranged according to its angle of repose between perforated and circumferentially extending walls. In this example, these walls are placed one vertically over the other and are formed as cone frustums 3' and 3'' concentrically disposed approximately opposite one another with the conical surfaces tapering in opposite directions. The gases deposit their dust particles in the sand and are discharged in a purified state into the annular space 4 and then through pipe 5.

The arrangement for holding the sand consisting in making use of cone frustums is to be recommended in the case of fine sand. If the sand particles are larger (for example 4 mm.), the sand may be simply held in vertical layers between two perforated cylindrical metal sheets or between two grids.

Figure 2:
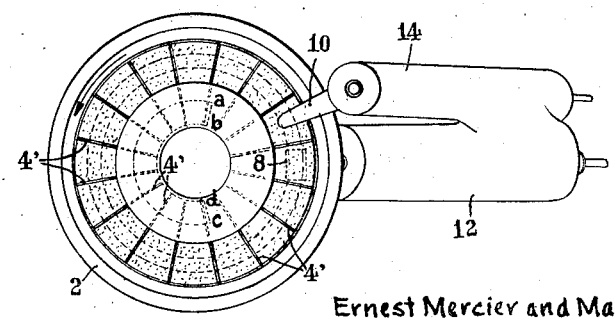
Fig. 2 is a plan view of the device of Fig. 1 with certain parts omitted.

The layer of sand together with its support, which will hereinafter be called the rotor, is shown as rotated by the mechanism 6, constituted for example by a worm and gear. The rotor is carried by shaft 16 with its lower end wall adjacent but with a slight clearance in relation to a fixed plate 7. It is partitioned by radial partitions 4' as shown in Fig. 2. During its rotation, the various cells of the rotor filled with sand pass with slight clearance over a fixed rim 9 formed as an extending flange of plate 7 which ensures closure of the cells at the bottom of the space containing the sand, whilst gas ducts 4 also formed between partitions 4' pass in turn into register with an opening abcd of the plate 7 shown in dotted outline in Fig. 2. It is during this part of the rotation in which each of the cells in succession has its opening from the duct 4 communicating with the opening abcd that the gases pass through the sand.

The part of the rotation at the right hand of Fig. 2, from the line *cd* to line *ab* is not used for the removal of the dust, because the wall 7 in this zone closes the ducts 4. This right hand zone, however, serves for emptying the sand through the opening 8 (Figs. 1 and 2) provided in the fixed rim or flange 9. The arcuate extent of the opening *abcd* may be varied and made sufficient to determine that the dust laden gas shall flow through a predetermined number of cells and a predetermined portion of the filtering sand sufficient to effect the desired removal of dust from the gas. The arcuate extent of opening 8 may be made sufficient readily to empty the sand from one or more cells in register therewith.

The sand is introduced through the pipe 10. The rotor rotates in the direction of the arrow in Fig. 2 and discharges the sand through the opening 8. The sand then falls into a screen 11 which is shown as rotary but which might be of another type and which separates out the dust particles into a hopper 12 whence they are discharged through the pipe 13, with or without injection of water. The sand then passes into an apparatus such as, for example, the screw conveyor 14 which raises it again to the top of the rotor for return to the cycle.

The screen 11 may be sprinkled with a solvent, such as water, in the case of soluble dust particles.

All of the devices of the apparatus are enclosed in enclosures which are interconnected and are constructed to withstand the gas pressure.

Figure 3:
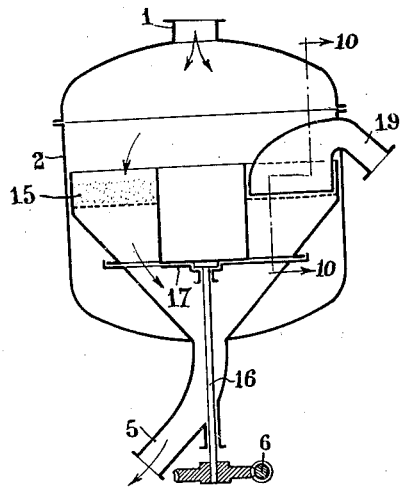
Figs. 3, 4 and 5 show modifications of the dust separator of the invention.

In Fig. 3, the rotor has the form of an annular receptacle 15 having a perforated bottom on which the sand is spread in a uniform layer. The passage of the gas for the most part takes place as in Fig. 2 over a fraction of a rotation, the gas being constrained by means of an opening of suitable circumferential length made in the fixed plate 17 to flow through the portion of the sand which is clean adjacent said opening. The contaminated sand which resists flow of gas therethrough is discharged by means of a plough share shaped member or scoop through the pipe 19, Figs. 3 and 10, and it is then subjected to screening and is returned to the rotor, as described in connection with Fig. 1, for example. The scoop is located in the zone opposite to that above the opening through plate 17 in which opposite zone gas flow is cut off by plate 17.

This simpler device may be used when the mass of the gases to be purified is not large or when their pressure is comparatively low.

Figure 4:
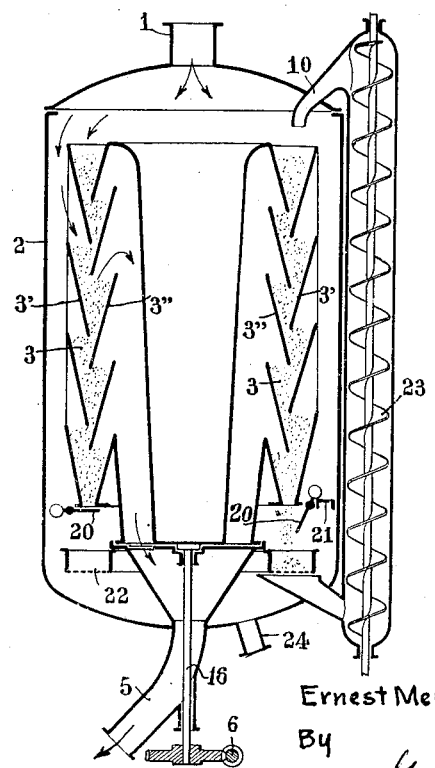

In Fig. 4, another means for discharging the sand has been shown. It consists of a chute trap 20 which pivots at a suitable point by means of a cam 21. The sand falls on to a circular vibratory screen 22 actuated by the rotor, or any other suitable device not shown, and it is propelled towards the screw 23 whilst the dust particles are separated out through outlet 24 at the bottom of the container 2.

Figure 5:
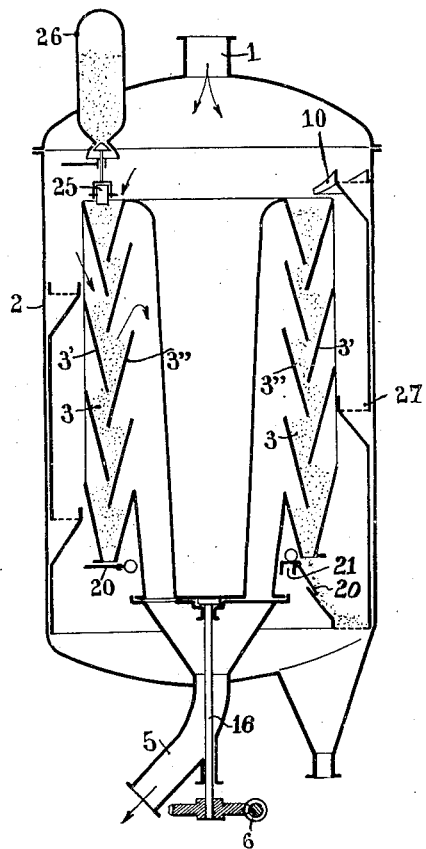

In Fig. 5 the vibratory screen 27 is combined with the sand lifting screw, thereby providing in the machine an extremely simple construction. The level of the sand can be regulated by a roller 25 rolling on the surface of the sand and which, in case its position is too low, allows sand to fall from a supply 26.

In dust separators for large outputs, it may be preferable to arrange concentrically two or more filtering layers, with a view to reducing the vertical space taken up by the apparatus.

Figure 6:
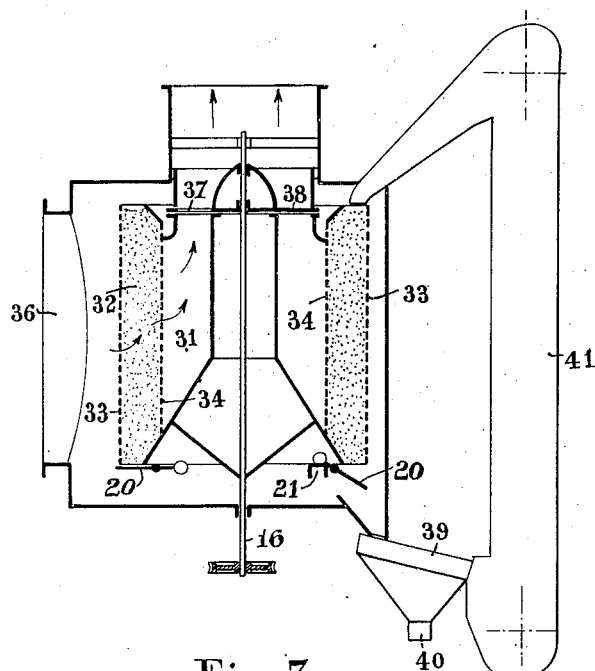
Figs. 6 and 7 show respectively in vertical and horizontal section another modification embodying the invention.

The path of the gases, which has been shown as descending in Figs. 1 to 5, if desired may be upward or in other direction by suitably constructing the container 2 and the sand supporting walls 3'. Fig. 6 shows one form of such modification.

The filtering medium may be constituted by spherules. Any suitable material may be chosen therefor.

Figure 7:
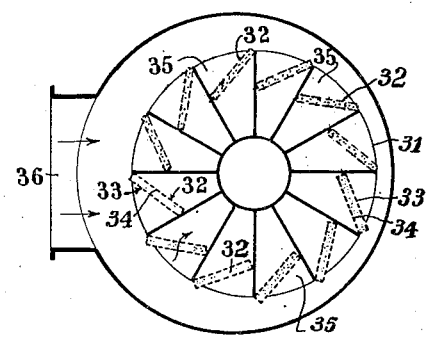

According to the embodiment shown in Figs. 6 and 7, the rotor 31 comprises filtering units 32 formed of two parallel perforated walls 33, 34 in the form of a grid or made of perforated sheet metal, between which is placed the sand. The filtering units 32 may be disposed in the cells 35 so as to take up very little space. In Fig. 7 there is one filtering unit 32 for each cell 35 arranged at an angle to the circumference of the rotor. In Fig. 8 there are two filtering units 32 for each cell 35 arranged at an angle to each other and symmetrically with respect to the median radius of the cell. The latter arrangement enables a large filtering surface to be provided by the filtering units or a reduced volume of the rotor of the apparatus for a given filtering surface.

In this form the apparatus of the invention is adapted to serve, for example, as dust separator for smoke issuing from large modern boilers.

The dust laden gas is admitted at 36, passes through the filtering surfaces and escapes, free of dust, through the openings 37 arranged in the plate 38.

The sand laden with dust is discharged from the filtering surfaces and falls into the vibrating screen 39 when the chute trap 20 is operated as described in connection with Fig. 4. The screen 39 separates out the dust particles and discharges them through the outlet 40. The clean sand is raised by the elevating device 41 in order to supply it again to the filtering units 32.

In large size apparatus the sand, as it falls between the vertically disposed walls of the filtering units 32 might split up into finer particles. With a view to avoiding this, the filtering units 32 may be provided with baffle plates 42 between the walls 33, 34, Fig. 9, to ensure descent of the sand as far as possible by a sliding motion.

The sand may be constituted by a filling material of any kind, for example by pieces of tubing placed in a loose mass in the filtering units. It may also be constituted by a material adapted to combine with a constituent of the gas, so as to purify the latter, for example with a view to eliminating sulphurous anhydride.

In the structures shown in the drawings the dust laden gas which is admitted to the separating chamber within the casing or enclosure 2, is induced to move downwardly or upwardly through this chamber at the left hand portion thereof. This causes the dust laden gas to pass through the portions of the sand or other particulate material which at the moment are at the left hand of the rotating member which carries the particulate material. In Fig. 3 this dust laden gas for the most part passes downwardly through the portions of the sand at the left hand of the annular receptacle 15. Although in the structure of this figure the rotatable member is not shown as divided into cells, as in the structure of Fig. 1, nevertheless, as the opening in the wall 17 is made at the left hand of the conical receiver which is connected to the gas discharge pipe 5, the gas is induced to flow toward the left and cannot flow downwardly through the wall 17 at the right, there being no opening in this wall at the right hand portion thereof. At the right hand portion, however, out of the path of substantial flow of the gas the sand is removed from the receptacle by the scoop connected to the outlet pipe 19 for picking up the contaminated sand and discharging it through this outlet pipe 19.

It will be apparent also that in the structures of Figs. 1, 2, 4, 5, 6 and 9 the dust laden gas is constrained to move through the several portions of the mass of sand which are supported by the frusto-conical members 3', 3'', or the filter units 52 or by the baffles 42, between which also the gas may pass in the direction from the periphery of the rotatable member transversely of the axis of rotation. The gas is caused to move in this manner because the opening $abcd$ in the wall 7 is formed in the zone at the left hand of the structure as shown in Fig. 2 and there is no such opening at the right hand portion of this wall. The gas, therefore, is prevented from flowing through the portions of the mass of the particulate material which are supported by the members 3', 3'' or 32 or 42 when these portions in their rotation reach the zone at the right hand of the structure. As the mass of sand rotates into the zone at the right hand portion of the structure it therefore may be removed for decontamination without substantial disturbance which would occur if the dust laden gas could flow through this zone.

In the structures of Figs. 1, 2, 4, 5, 6 and 9 a plurality of passages are provided in the rotatable member by virtue of the arrangement of the radially extending walls or partitions 4'. These walls constitute additional means for insuring that the dust laden gas passes through the zone at the left hand of the structure in these figures and is prevented from passing through the zone at the right hand of the structure. As the radial partitions 4 form cells between which the supporting frusto-conical members 3', 3'' or the filler units 32, or the baffles 42 are mounted for support of the particulate material, the gas must pass generally downwardly through the passages between these partitions and out through the opening $abcd$ of Fig. 2 or upwardly through the opening 31 in Fig. 6. Since the portion of the wall 7 of Fig. 1, for example, which is at the right hand of the structure closes the lower ends of the passages between the partitions 4, when these passages are in the zone at the right hand of the figure, the gas is prevented from flowing through the passages when in this right hand zone.

The provision of a plurality of cells in the rotatable member also insures a uniform condition of the mass of the particulate material which is presented to the dust laden gas for removing the dust therefrom. As the rotatable member rotates in the direction of the arrow in Fig 2, for example, the decontaminated or fresh material which is discharged into a cell from the pipe 10 at the top of the conveyor 14 is first brought into contact with the dust laden gas as this cell begins to pass over the line $ab$ of the opening $abcd$ in Fig. 2. As the cell revolves about the axis of the rotatable member toward the line $cd$, it may pick up more of the dust from the gas. As each cell of the rotatable member passes through the dust removal zone the conditions to which it is subjected are the same as that to which the other cells are subjected in succession. The condition of the particulate material presented to and brought into contact with the dust laden gas as a whole thus may be substantially constant.

The apparatus as shown in Figs. 1, 4, 5 and 9 is constructed so that the dust laden gas is free to pass about the rotatable member within the separating chamber 2 in a plurality of paths through the spaces between the sand supporting members 3', 3'' or 42 distributed along the lengthwise extent or height of the rotatable member. As each of the cells or passages of the rotatable member between the partitions 4' has a bottom outlet which in succession comes into register with the outlet opening $abcd$ in the wall 7, the number of cells through which the gas is constrained to flow in the zone in which the dust is removed therefrom is determined by the circumferential extent of the annular opening $abcd$ but is constant. A definite flow area thus may be provided to induce the gas to flow through the mass of the sand or particulate material properly to effect removal of the dust therefrom. The partitions 4' in cooperation with the central conical core wall and the wall 7 prevent flow into the cells in the right hand zone.

As the openings of the cells which are formed between the lowermost of the members 3', 3'' revolve into register with the opening of the conduit 8 for discharge of the contaminated sand to the screening device 11, the openings at the lower end of the passageways between the partitions 4' for the discharge of the gas become closed by the wall 7, thus preventing flow of the gas through the sand in the zone of removal of the sand from and of refilling of the cells formed between the partitions 4'. In the structures of Figs. 4, 5 and 6 the chute traps 20 actuated by the cams 21 serve to close and open the lowermost ends of the sand filled spaces respectively in the zones of dust removal and of removal of the sand for decontamination.

Although in the foregoing description it has simply been explained that the layer of sand through which the gas passes to be freed from dust is adapted to rotate, it is to be understood that the invention is applicable to the case where the rotary movement of the sand with respect to the supply and discharge members and the members for interrupting the passage of the gases is a relative rotary movement, i. e. it is conceivable that the sand layer may remain fixed and the various aforesaid members may rotate, the sand and dust separator and the elevating device remaining fixed.

What we claim as our invention and desire to secure by Letters Patent is:

1. Apparatus for separating from a gas material suspended therein which comprises means providing a separating chamber, a member rotatable within said chamber and constructed to provide a plurality of gas passages distributed circumferentially about the axis of rotation of said member, means cooperating with said member for supporting particulate material within said passages, and means for conveying the gas carrying the suspended material through some of said passages for removal of the suspended material by contact with said particulate material during rotation of said member while preventing movement of the gas through others of said passages.

2. Apparatus as defined in claim 1 which comprises means for delivering fresh particulate material to said passages while withdrawing contaminated particulate material therefrom.

3. Apparatus for separating from a gas material suspended therein which comprises means providing a separating chamber, a member rotatable within said chamber and constructed to provide a plurality of gas passages distributed circumferentially about the axis of rotation of said member, means cooperating with said member for supporting particulate material within said passages, means for conveying the gas carrying the suspended material through said passages of said rotatable member as said passages move in the rotation of said member through a sector at one side of said axis of rotation, and means for removing the contaminated particulate material from said passages as they move through a sector at the opposite side of said axis of rotation.

4. Apparatus for separating from a gas material suspended therein which comprises means providing a separating chamber, a member rotatable within said chamber and constructed to provide a plurality of gas passages distributed circumferentially about the axis of rotation of said member, means cooperating with said member for supporting particulate material within said passages, means for conveying the gas carrying the suspended material through said passages of said rotatable member as said passages move in the rotation of said member through a sector at one side of said axis of rotation, means for removing the contaminated particulate material from said passages as they move through a sector at the opposite side of said axis of rotation, means for substantially preventing movement of the particulate material through said passages in the sector in which said gas is conveyed therethrough, and means for substantially preventing movement of the gas through said passages in the sector in which said contaminated particulate material is being withdrawn from said passages.

5. Apparatus for separating from a gas material suspended therein which comprises means providing a separating chamber, a member rotatable within said chamber and constructed to provide a plurality of gas passages distributed circumferentially about the axis of rotation of said member, means cooperating with said member for supporting particulate material within said passages, means for conveying the gas carrying the suspended material through said passages of said rotatable member as said passages move in the rotation of said member through a sector at one side of said axis of rotation, means for removing the contaminated particulate material from said passages as they move through a sector at the opposite side of said axis of rotation, means for decontaminating said removed particulate material, and means for returning the decontaminated material to said passages of said member.

6. Apparatus for separating from a gas material suspended therein which comprises means providing a separating chamber, a member rotatable within said chamber and constructed to provide a plurality of gas passages distributed circumferentially about the axis of rotation of said member, means cooperating with said member for supporting particulate material within said passages, means for conveying the gas carrying the suspended material through the passages of said rotatable member as said passages move in the rotation of said member through a sector at one side of said axis of rotation, means for removing the contaminated particulate material from said passages as they pass through a sector at the opposite side of said axis of rotation, means for decontaminating said removed particulate material, and means for returning the decontaminated material to said passages of said member, said means providing a chamber and said means for decontaminating said particulate material and said means for returning said decontaminated material being constructed to confine the gas at a substantial pressure and having their gas containing spaces in communication, whereby said particulate material is decontaminated at the pressure of the gas from which the suspended material is separated.

7. Apparatus as defined in claim 1 which comprises a wall defining a receiver for receiving the gas discharged from said passages after passing through said particulate material, said wall having an inlet opening therein for passage of said gas therethrough into said receiver, said member being constructed with an outlet opening for each passage registering with said inlet opening in said wall of said receiver during a part of the rotation of said member and closed by said wall during another part of said rotation of said member, whereby said gas is intermittently passed through the successive passages containing said particulate material as they move about said axis of rotation.

8. Apparatus for separating from a gas material suspended therein which comprises means providing a separating chamber, a member rotatable within said chamber and constructed to provide a plurality of gas passages distributed circumferentially about the axis of rotation of said member, means cooperating with said member for supporting particulate material within said passages, means for conveying the gas carrying the suspended material through some of said passages for removal of the suspended material by contact with said particulate material during rotation of said member while preventing movement of the gas through other of said passages, each passage having an opening for discharge of the particulate material therefrom, a conduit for receiving contaminated particulate material from said passages and having its inlet opening successively registerable with the passage discharge openings during the part of the rotation of said member in which the gas is prevented from moving through said passages for effecting discharge of said contaminated particulate material, and means for preventing discharge of particulate material from said passages during the part of the rotation of said member in which gas is conveyed through said passages.

9. Apparatus as defined in claim 1 which comprises means for confining the gas to flow through said gas passages in the direction transversely of the axis of said rotatable member.

10. Apparatus as defined in claim 1 which comprises means for confining the gas to flow through said gas passages in the direction transversely of said axis of said rotatable member and for providing a plurality of paths of said transverse flow of the gas in each passage.

11. Apparatus as defined in claim 1 in which said passages are formed as cells in said member with radially extending walls, and said means for supporting the particulate material comprises a plurality of elements arranged within each cell for confining the gas to flow generally radially therethrough.

12. Apparatus as defined in claim 1 in which said passages are formed as cells in said member with radially extending walls, and filter units containing the particulate material having generally parallel faces and arranged with said faces extending at an angle to the circumference of said member and forming the wall of said cells adjacent said circumference for passage of the gas generally radially therethrough.

13. Apparatus for separating from a gas material suspended therein which comprises means for supporting a mass of particulate material distributed in two zones and so as to prevent substantial interchange movement of the particles of the mass in a given one of said zones, means for confining said gas carrying said suspended material to flow through said given zone, means cooperating with said supporting means and operable to bring successive portions of said mass into contact with said gas flowing in said given zone so that said gas flows through said portions for removal of the suspended material therefrom and thereafter in said other zone said gas is prevented from passing through said portions, and means cooperating with said supporting means and effective only in said other zone for withdrawing particulate material from said portions of said mass in said other zone for decontamination.

14. Apparatus for separating from a gas material suspended therein which comprises means providing a gas confining chamber, a member within said chamber constructed to support a mass of particulate material distributed about an axis of rotation, means within said chamber for confining the gas to flow through a portion only of said mass of particulate material angularly displaced about said axis from another portion of said mass, means for producing relative rotation of said member and said gas confining means upon said axis, and means cooperating with said member and said gas confining means and effective only on said other portion of said mass for withdrawing the contaminated particulate material from said member while substantially preventing flow of the gas through the contaminated material during such withdrawal thereof.

15. Apparatus for separating from a gas material suspended therein which comprises means providing a separating chamber, means constructed to provide within said chamber a plurality of gas passages extending generally parallel to each other and distributed transversely of said extent thereof circumferentially about said chamber with respect to each other, means cooperating with said means providing said gas passages for supporting particulate material within said passages, means for conveying the gas carrying the suspended material through some of said passages for removal of the suspended material by contact with said particulate material while preventing movement of the gas through others of said passages, and means for successively changing the flow of said gas through said passages to convey the gas through some of said other passages while preventing flow thereof through some of said passages through which the gas was first conveyed.

16. Apparatus as defined in claim 15 in which said means providing said passages is constructed to form cells with walls extending generally radially from a central portion thereof which provides an inner wall for each cell, said means for supporting particulate material comprising filter units having generally parallel faces arranged respectively in said cells with said faces extending generally parallel to the extent of said passages and respectively at an angle to the radial walls of said cells to form the outer walls of said cells.

17. Apparatus for separating from a gas material suspended therein which comprises means providing a separating chamber, a member rotatable within said chamber and constructed to support and revolve a mass of particulate material about the axis of rotation of said member, means cooperating with said rotatable member for confining the gas to flow in said chamber through a portion only of said mass of particulate material during a part of the revolution thereof about said axis, means cooperating with said rotatable member for preventing flow of the gas through said portion of said particulate material during a succeeding part of the revolution thereof about said axis, and means cooperating with said flow preventing means and effective only upon said portion of said mass during said succeeding part of the revolution of said mass for removing the contaminated particulate material from said rotatable member.

ERNEST MERCIER.
MARCEL EHLINGER.

REFERENCES CITED

The following references are of record in the file of this patent:

UNITED STATES PATENTS

| Number | Name | Date |
|---|---|---|
| 1,549,680 | Nordstrom | Aug. 11, 1925 |
| 1,731,223 | Brady | Oct. 8, 1929 |

FOREIGN PATENTS

| Number | Country | Date |
|---|---|---|
| 704,568 | France | May 22, 1931 |
| 713,691 | France | Oct. 31, 1931 |
| 514,169 | Germany | Nov. 27, 1930 |
| 76,683 | Switzerland | Nov. 2, 1918 |